United States Patent [19]
Chisholm et al.

[11] 3,821,523
[45] June 28, 1974

[54] AIRCRAFT LOCATING SYSTEM USING AGILE TACAN/VORTAC/DME

[75] Inventors: John P. Chisholm, Boston, Mass.; William T. Lennon, Jr., Williamsville, N.Y.; James R. Doane, Grand Island, N.Y.; Frank Z. Maslow, West Seneca, N.Y.

[73] Assignee: Sierra Research Corporation, Buffalo, N.Y.

[22] Filed: May 7, 1973

[21] Appl. No.: 358,074

[52] U.S. Cl. ... 235/150.27, 235/150.2, 343/112 TC
[51] Int. Cl. .......................... G06f 15/48, G01s 5/14
[58] Field of Search....... 235/150.2, 150.26, 150.27; 343/112 R, 112 C, 112 D, 112 TC

[56] References Cited
UNITED STATES PATENTS

| | | | |
|---|---|---|---|
| 3,434,140 | 3/1969 | Chisholm | 343/112 TC UX |
| 3,612,837 | 10/1971 | Brandau | 235/150.2 |
| 3,659,085 | 4/1972 | Potter et al. | 235/150.2 |
| 3,705,404 | 12/1972 | Chisholm | 343/112 TC X |
| 3,721,985 | 3/1973 | Perfitt | 235/150.27 X |

*Primary Examiner*—Charles E. Atkinson
*Assistant Examiner*—Jerry Smith
*Attorney, Agent, or Firm*—Alexander & Dowell

[57] ABSTRACT

A system for using ranges measured from aircraft to multiple ground stations of the TACAN, VORTAC, VOR/DME, or DME type wherein only the distance measuring features of the ground and airborne units are used to determine location of the aircraft to a high degree of accuracy far exceeding the normal capability of this type of equipment, the present system using an agile airborne DME unit which is switched in a rapid manner to interrogate said multiple ground stations successively and measure ranges thereto, the number of ground stations interrogated exceeding the minimum number required to provide a location, and a computer then processing this redundancy of range measurements by employing error factors for the measured ranges, which error factors are used in iterative computations to converge the apparent locations of the aircraft upon the actual locations.

11 Claims, 4 Drawing Figures

PATENTED JUN 28 1974 3,821,523

AIRCRAFT LOCATING SYSTEM USING AGILE TACAN/VORTAC/DME

This invention relates to systems for more precisely locating aircraft in flight by making more efficient use of existing transponder systems of the TACAN, VORTAC, VOR/DME or DME type, and more particularly by having the aircraft measure a redundancy of ranges to a number of ground stations in the vicinity in rapid succession and then iteratively utilize these measured ranges to compute aircraft position, while at the same time compensating for errors in the measured ranges so that computed aircraft locations converge on actual aircraft locations.

The use of TACAN, VORTAC, VOR/DME or DME airborne and ground units to determine location is especially attractive because of the large numbers of ground stations available all over the world and because airborne DME units are well developed and relatively inexpensive and are found in most aircraft today. However, little attention has been devoted to using this type of equipment for precision measurements of location, partly because the equipment was initially designed merely to provide convenient enroute navigation having only nominal accuracy and this type of thinking has continued to characterize it. As a matter of fact, the largest errors lie in the bearing aspect of TACAN and VORTAC type systems, while the DME aspect thereof is capable of great accuracy in measuring distances, especially if the standard transponder delays (50 microseconds) introduced at the ground stations were calibrated more closely.

The prior art includes a very large number and variety of systems serving to locate an aircraft with respect to multiple spaced ground stations, in some instances by introducing the relative times of arrival of aircraft-transmitted signals into a computer to compute its location as shown, for instance, in some of the illustrations in Potter et al. U.S. Pat. No. 3,659,085; or in other instances by measuring ranges between the aircraft and the ground stations and introducing these ranges into a computer to determine aircraft position as discussed, for instance, near the bottom of column 68 of that patent. The present invention is of the latter type, since DME systems involve both interrogation of ground station transponders and replies to the aircraft from them.

However, if a high degree of accuracy is required while at the same time using already existing navigation facilities to avoid the necessity of building new and more precise facilities, then the greater accuracy must be achieved by measuring distances from the aircraft to a larger number of ground stations than the irreducible minimum required to provide a system having mere operability. Where excess information is obtained by redundant measurement of range, a computer can be used to process these multiple measurements, i.e., from five or six or more stations perhaps, and to thereby determine the magnitudes and signs of the errors involved in each measurement. Such errors have been determined in actual practice by measuring multiple ranges to TACAN stations during series of flight tests, and the errors are found to remain fairly constant over long periods of time, thereby encouraging the use of error factors calculated from prior sets of range measurements to compensate present and future sets of measurements to the same ground stations so that most of the positional error is eliminated over a series of successive measurements and calculations. This iterative computational approach to the elimination of errors is extensively discussed in the above mentioned U.S. Pat. No. 3,659,085.

It is the principal object of this invention to provide a system using existing TACAN, VORTAC, VOR/DME or DME type ground stations without alteration, in cooperation with airborne standard DME equipment virtually without alteration, and in cooperation with a limited purpose computer, to provide aircraft locations having accuracies greatly exceeding the accuracies obtainable with such equipment when used in its normal performance mode.

One principal consideration preventing the provision of a practical aystem of the above type using existing TACAN, VORTAC, VOR/DME or DME equipment has been the fact that all of the ground stations in a given area operate on different channel frequencies, and therefore, would in the past have required on each aircraft a large number of airborne DME units, one for each channel to be used, thereby raising the cost of such a system beyond its potential savings which are based upon the use of already-existing DME equipment. A practical system must economize on the equipment carried aboard each aircraft.

It is another principal object of this invention to provide a system requiring only a single DME unit in the aircraft, in which this DME unit is of the agile tuning variety capable of rapidly changing channels (in about 1 millisecond or less) using electronic transmitter and receiver tuning means, and in which the same DME is sequentially retuned to make range-measurements successively in preselected channels. However, even though the retuning of the airborne DME can be accomplished in so short a time, the airborne DME still requires after each change of channel a certain amount of time in which to search for and lock onto the pulse replies from the interrogated ground station, thereby eliminating responses to interrogations initiated by other aircraft. Therefore the present system allows the airborne DME sufficient lock-on-time, as will be discussed hereinafter, before retuning it to the next ground station channel in the sequence. In practice in present operating systems this time amounts to about one second. As a result, there is considerable time slewing between the range measurements made by an aircraft during one complete set of measurements to all of the ground stations which are included in one cycle of the preselected sequence of channels. As a result, that aircraft actually occupies a different spatial location at the time of each measurement. Hence, six such ranges to six different ground stations, for example, do not establish a single-point aircraft location, and if nothing were done to account for this time-slewing the computed aircraft locations would be quite inaccurate. The computer provides a practical solution. In the present illustration, as the airborne DME measures the six ranges, together comprising what is referred to herein as a set, the computer notes the times of the measurements. These measurements should not be thought of as being isolated because they are actually made repeatedly over-and-over again. The computer then selects an arbitrary moment of time during each set and interpolates all six range measurements corrected to this arbitrary time. The resulting ranges, corrected to this time are therefore de-skewed sufficiently to define location of the aircraft at that arbitrary moment. These corrected ranges are thereafter used by the computer in its computations. Such interpolation provides good practical correction, although even closer accuracy could be obtained by fitting a second order curve to the skewed points and performing a second-order interpolation.

Another consideration which in the past has tended to relegate TACAN, VORTAC, VOR/DME or DME equipment to measurements requiring only nominal accuracy is the fact that range errors in existing ground transponder systems have been large, and little effort has been made to deal with them. These range errors can be divided into "random" errors and into errors referred to by persons skilled in the art as "bias" errors. Random errors are the lesser of the two types, caused mainly by receiver noise, and are usually small, typically of the order of 10 feet where the DME has a proper AGC and where signal levels are reasonable. Because of the fact that the computer is averaging numerous measurements from the ground stations, the positional error due to said random errors becomes very small. On the other hand, so-called "bias" errors are often much larger. The ground station is supposed to introduce a standard 50-micro-second delay before replying to an interrogation, and the airborne DME is supposed to compensate for this delay. Nevertheless, in practice the ground station delay errors are often found to be quite substantial due to poor calibration and change in delay with signal strength. Recent flight tests over New York State showed "bias" errors in local ground station replies of as much as 400 feet. However, these errors tend to remain rather constant in the case of each station and can therefore be converged upon and averaged by the computer to provide good compensation of the respective range measurements, leaving only the smaller random errors superimposed. An exemplary computation for this purpose appears near the end of the specification.

It is therefore a major object of this invention to provide an agile-tuning TACAN, VORTAC, or DME airborne unit in combination with a computer capability in which errors in the DME measurements are compensated or eliminated by the computer incident to the computing of position of the aircraft. The computer may be either in the aircraft, or else on the ground and coupled to participating aircraft by data link.

There is a movement under way at present to distinguish the various TACAN, VORTAC, VOR/DME or DME ground stations by pulse encoding as well as by frequency switching, or in place of frequency switching, and therefore this invention contemplates the use of either method of identifying specific ground stations for interrogation, i.e., either by agile tuning of the airborne DME unit, or else by rapid changing of its pulse group encoding.

Other objects and advantages of the invention will become apparent during the following discussion of the drawings, wherein:

DRAWINGS & ILLUSTRATIVE EMBODIMENTS

Figure 4:
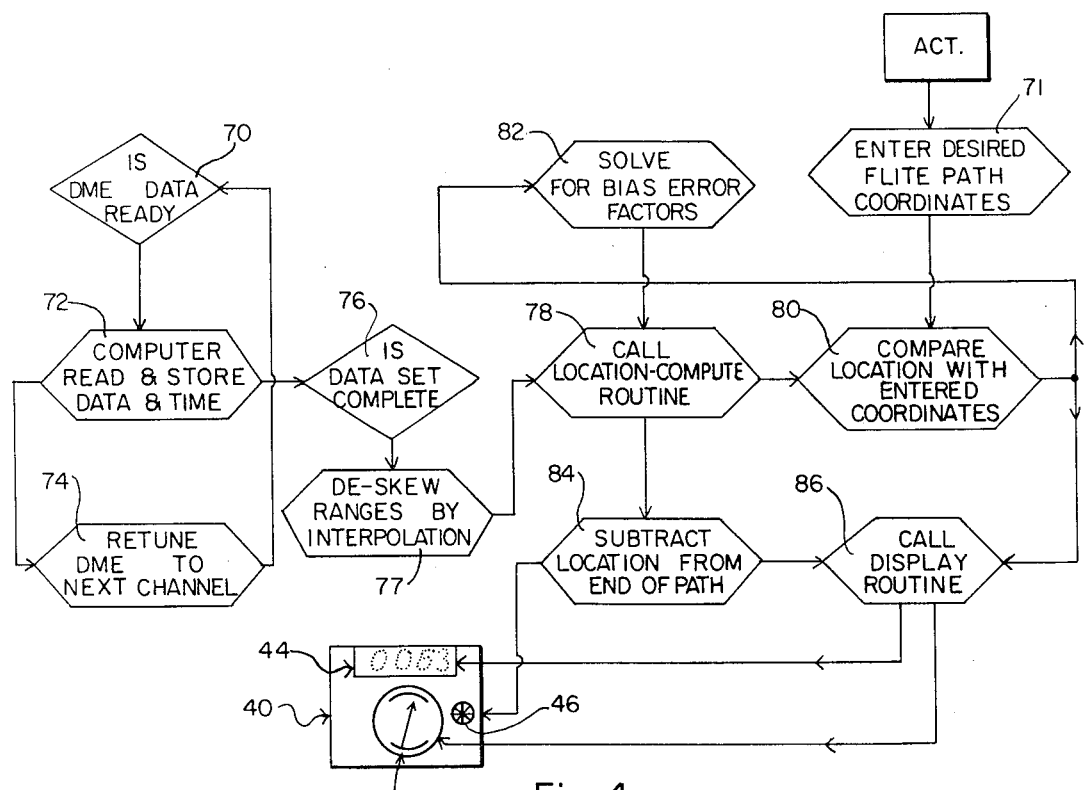
Figure 3:
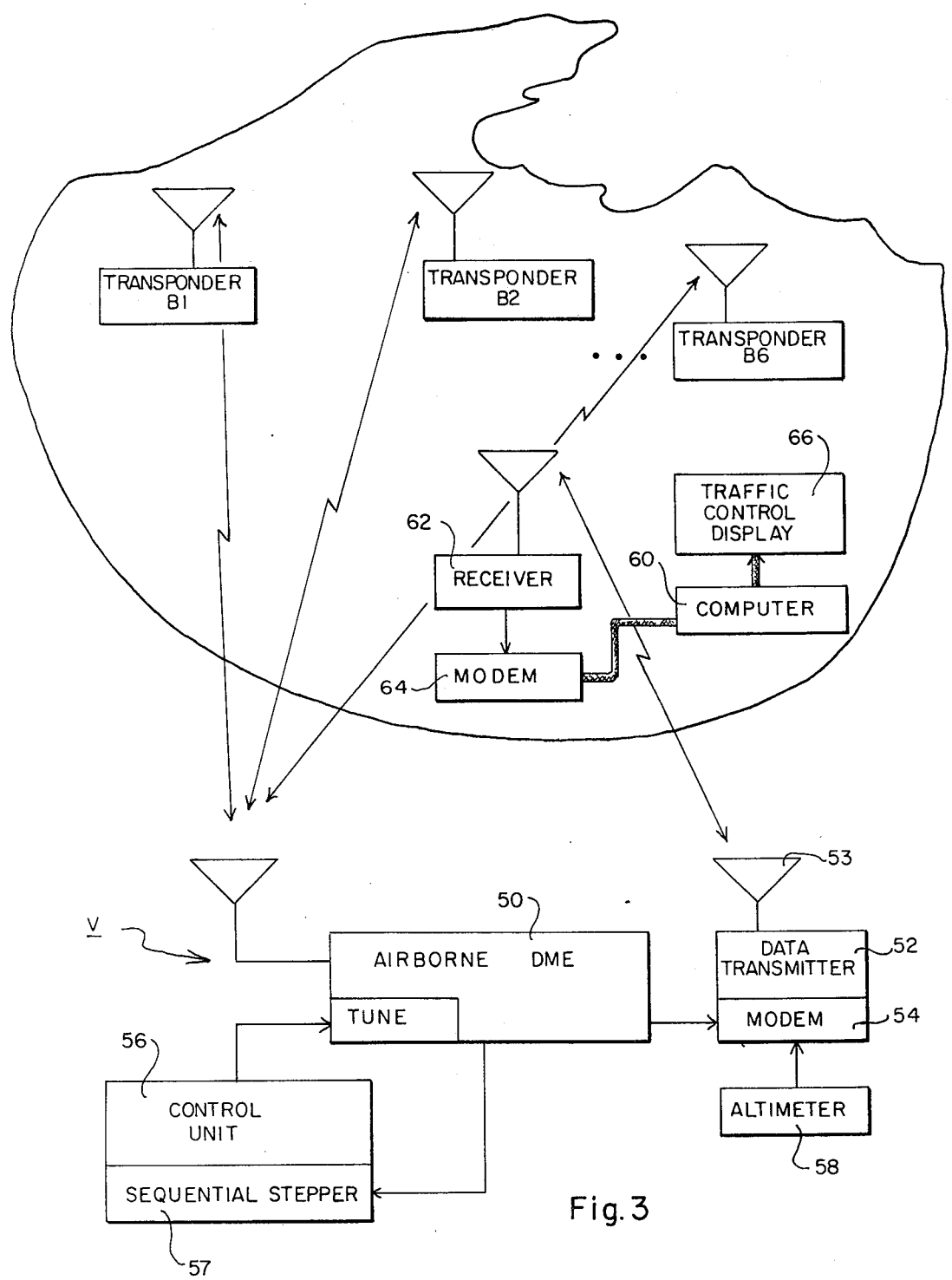

FIG. 3 is a modified system according to the present invention where a common computer on the ground is data-linked to all participating aircraft in the vicinity; and FIG. 4 is a flow diagram showing the steps gone through by the system in switching the airborne DME to measure distance to the various ground transponder stations, in calculating position of the aircraft with respect to those ground stations, and in displaying the resulting positional information.

Figure 1:
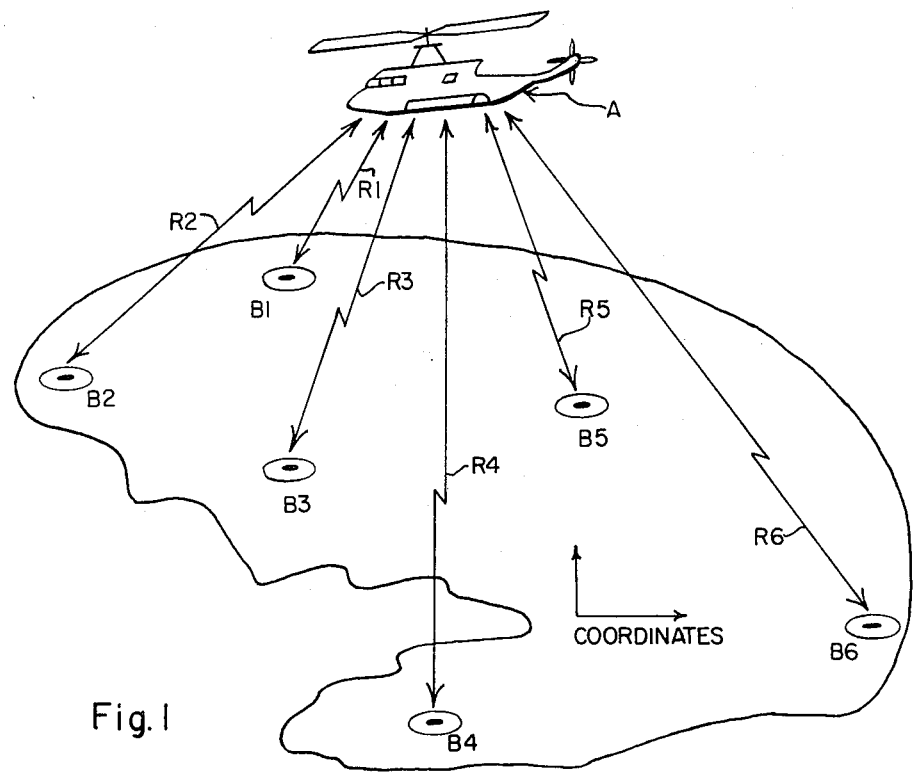
FIG. 1 is a perspective view showing six ground stations being ranged upon by an aircraft flying above them.

Referring now to FIG. 1, this figure shows a vehicle such as an aircraft, flying above the earth on which are located six transponder ground stations B1, B2, B3, B4, B5 and B6. The slant ranges of the aircraft to each of these stations are shown on the diagram and labelled R1, R2, R3, R4, R5 and R6.

Figure 2:
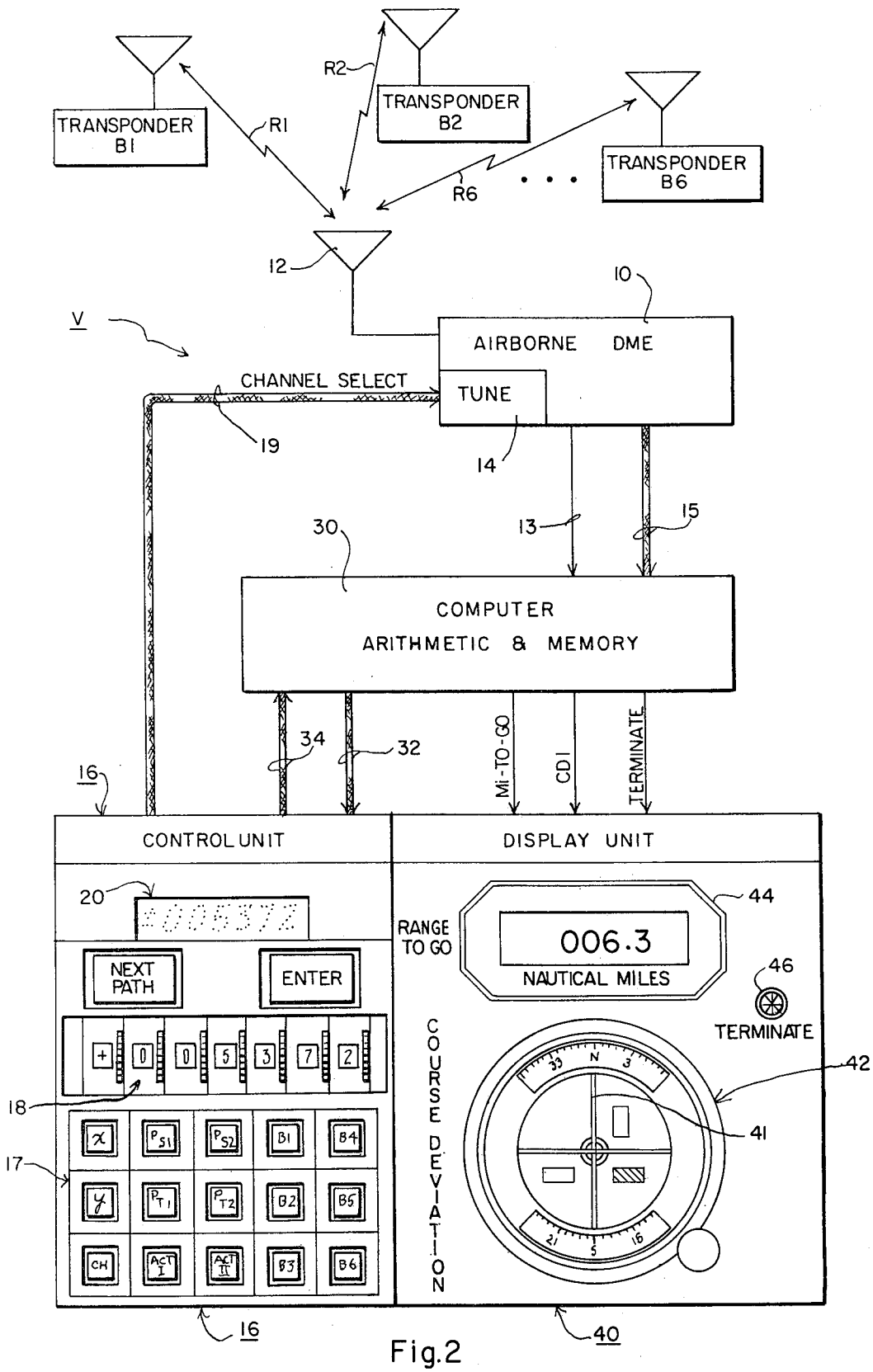
FIG. 2 is a block diagram of a system according to the present invention where a computer is carried in each aircraft.

FIG. 2 shows a block diagram of an exemplory system including the ground stations B1 through B6 comprising fixed DME transponders of the TACAN, VORTAC, VOR/DME or DME type. In the present disclosure only the DME portion of each ground station is of interest. The bearing portion of the station is not used in locating the aircraft.

Within each aircraft there is an agile-tuning digital DME unit 10 having an antenna 12 by which the various ground transponders B1 through B6 are sequentially interrogated and by which their replies are received and delivered to the DME unit 10. This unit is a standard off-the-shelf unit manufactured by various different companies, for instance the Sierra Research Model 7000A, and it includes standard tuning electronics 14 as part of the DME unit. The tuning means can be easily accessed and coupled so that it can be externally actuated to tune both the transmitter and the receiver within the DME unit to select a particular ground station channel when actuated to do so by the computer. In the present illustrative example there are six ground transponder stations B1 through B6 to be interrogated within radio-range of the aircraft. The control unit 16 under command by the computer 30 actually controls the repeating sequence in which the transmitter and receiver channels are selected within the DME. It also has a keyboard 17 by which the desired sequence is initially set into the computer. A set of six thumb wheel switches 18 is shown on the front panel of the control unit 16 and these switches are used in the manner to be hereinafter explained for entering the sequence of channel frequencies, one at a time, into the computer's memory. For example, to enter a new DME frequency channel into the computer memory bank the operator first depresses the push button B1, and then the push button CH which causes the channel in the memory corresponding with B1 to be displayed on the display 20. Then the operator enters a new channel frequency using the thumb switches 18 and depresses the ENTER button which results in entry of the new frequency for B1 into the computer memory and also the display of the new channel at the display 20. The remaining channels B2 through B6 are similarly entered. In addition, the coordinates of the start and stop points of predetermined desired flight paths can be entered into the computer using the push buttons marked PS and PT on the keyboard 17 and the thumb switches 18. The push buttons marked PS1 and PT1 are for the "start" and "terminal" coordinates of a first flight path to be flown, whereas the push buttons PS2 and PT2 are the "start" and "terminal" coordinate entry buttons for a second flight path to be flown. Thus, again using the thumb switches, a set of $x$ and $y$ coordinates of the start point are entered via the switches 18 and after that a set of $x$ and $y$ coordinates of the terminal point can be entered. For example, to enter the "start" point $x$ and $y$ coordinates into the computer memory bank the operator first depresses the PS1 push button and then the $x$ push button to show at the display 20 the value of the $x$ coordinate currently contained in the computer memory. Then the operator enters the new value for the $x$ coordinate in the thumb wheel switches 18 and depresses the ENTER push button, thereby substituting the new $x$ value into the computer memory and also displaying the value at the display 20. The operator enters the $y$ coordinate value in a similar way using the push buttons PS1, $y$, and the thumb wheels. The same procedure is followed for entering the "terminal" point coordinates using the push button PT1, as well as for entering the "start" and "terminal" coordinates of a second selectible flight path using the push buttons PS2 and PT2. After various numbers are entered at the thumb switches 18, they are also displayed by numerals in the window 20 so that they can be checked visually. The push buttons labelled ACT I and ACT II are used to activate these pre-entered flight paths points for comparison with computed aircraft locations after the pilot has flown the aircraft to the "start."

There are two standard DME modes of operation including an X mode in which interrogation and reply pulse groups each include two interrogated pulses spaced 12 microseconds apart; and a Y mode in which the interrogation pulse group employs interrogation pairs spaced 36 microseconds apart and in which the transponder reply pulse pairs are spaced 30 microseconds apart. These typical pulse-spacing modes are standard in the industry and form no part of the present invention. They are simply expedients that must be recognized in a practical system and can of course also be entered via the keyboard into the computer memory when selecting the desired channels in the sequence B1 through B6.

The computer unit 30 also includes suitable arithmetic units and memory banks, as well as a program having various subroutines discussed below with reference to the flow diagram of FIG. 4.

Various different displays are possible for presenting the computed locations of the aircraft in a useful manner, depending upon the specific use to which the system is to be put. The present example shown in FIG. 2 where a computer is carried in each aircraft employs a display unit 40 comprising a course deviation indicator (CDI) 42 having a vertical pointer 41 which, as is well known in the TACAN art, points straight up when the aircraft is precisely on-course, but points in the direction the pilot should steer to regain the prescribed course when the aircraft is off course. In addition, the display unit 40 includes a digital readout 44 which shows the computed distance-to-go to reach the "terminal" point of the prescribed course. When the "terminal" point is in fact reached, a light 46 comes on to indicate that the particular course has been terminated. The pilot can thereupon press the "NEXT PATH" button on the control unit keyboard 17 to commence the next flight path set into the computer's memory. As many flight paths can be pre-set using the keyboard 17 as the system is designed to accept and store.

Essentially, the difference between FIG. 2 and FIG. 3 resides in the fact that as shown in FIG. 3, the airborne DME unit 50 is coupled to a transmitter 52 through a modem 54 which can be part of a control unit 56. Altitude information may also be transmitted from an altimeter 58. The transmitter 52 transmits the measured ranges via an antenna 53 to a common computer 60 which is accessed through a receiver 62 and a modem 64. The switching of the DME from one ground station to the next sequential one is performed by the control unit 56 which is similar to the one shown in FIG. 2, except for the fact that it includes its own sequence-control stepping unit 57 which steps the DME through a sequence of channel selections and which moves on to the next selection after a time sufficient to permit the airborne DME to deliver a new range to the data link to be telemetered to the common computer 60. The data is then processed by the common computer 60 which may be located either in another aircraft or on the ground. The common display 66 in this illustration comprises an air-traffic control display panel of the type used in traffic control centers at airports, and voice communication from the operator at the display 66 to the pilot in the aircraft can serve to instruct him as to the course to fly. The ground computer 60 performs iterative converging computations in the same manner as the airborne computer in FIG. 2.

In the event that the available ground stations are of a type that is selected by pulse group encoding instead of by change of frequency, then the control unit will include push buttons operative to select specific pulse groupings instead of the frequency channel-entering and selecting push buttons 17, since the ground stations will all be identified and interrogated and their replies recognized, not by unique frequencies, but instead by distinctive pulse codes, i.e., by the spaces between the pulses in a pulse group and perhaps the number of pulses appearing in that group.

COMPUTER PROGRAM AND SYSTEM OPERATION

The computer is programmed to include routines designed to process data, to control the sequence of the system, and also to accept a set of initial conditions entered by the operator, for instance, as mentioned above using the keyboard 17 with switches 18 shown on the front panel of the control unit 16 in FIG. 2. These keyboard-entered initial conditions in the present example include the identities of the various ground transponder stations to be interrogated by the DME in the aircraft as identified and selected either by channel frequencies or by pulse encoding in the order of their interrogation, and further include "start" and "terminate" coordinates for one or more predetermined courses which are to be flown by the aircraft. When one of these courses is activated by pushing an ACT key, the system commences operation by selecting the first ground transponder by actuating the sequence control unit to adjust the airborne DME to that channel. The DME then interrogates the ground station, receives its reply and converts it into digital range ready to be read into the computer. When the DME has completed measuring a digital range and has it in the form of digital data, it puts out a "ready" signal to the computer on wire 13, FIG. 2, flagging it to accept the range via cable 15 and store the measured range. The computer the instructs the sequence control to retune the DME to the next channel and make the next range measurement in the entered sequence. The computer has its own internal clock (not shown) which is operative together with the program, when not interrupted, to actuate the computer to service the input range data as well as to control its display functions. This clock generated within the computer is also useful for other bookkeeping chores, such as keeping track of elapsed time for the purpose of computing the aircraft velocity if desired. The program also controls such other subroutines as the processing of input data and the dislay of computed data, all under the control of an executive routine which monitors the progress of the computations and calls up the various segments of the program as needed.

As pointed out above, an agile airborne DME can be retuned to a new channel in only about one millisecond or less, but once retuned it has to have time in which to search for those transponder replies made by the ground station to its own interrogations and to lock onto them, to the exclusion of replies meant for other aircraft. Off-the-shelf DME units have this feature built into them already. That is, when tuned to a new ground DME station, they go into a search mode and remain therein until they have successfully found their own replies as indicated by the airborne DME finding replies to at least six out of ten of its interrogations. When this occurs, the DME then goes into an operating mode in which it is locked onto the replies to its own interrogations. It is this change from "search" mode to "operating" mode internally accomplished by the standard DME that flags the computer indicating that it is now ready to read out a range for that ground station.

FIG. 4 shows the major steps in the routines of the present system during flight of the aircraft, and subsequent to the time when the pilot has pre-entered the identities of the ground stations to be interrogated and the coordinates of one or more desired flight paths using the keyboard 17, as shown in step 71. FIG. 4. When the pilot has brought the aircraft substantially to the "start" coordinates of the first desired flight path, for instance the path labelled No. 1 in the second column of push buttons 17 on the face of the control unit 16 of FIG. 2, the pilot then presses the ACT I button at the bottom of the keyboard 17 to initiate a desired flight-path calculating routine 78 and 80. However, it should be noted that the computation of location of the aircraft requires a complete set of ranges to all the selected ground stations. These ranges are entered one-by-one together with their times of reception and stored in the computer memory until a complete set has been entered. With regard to each measurement, when the DME has data ready for the computer as determined in step 70, it delivers an interrupt flag via wire 13, FIG. 2 to interrupt the computer's present subroutine and cause it to read from cable 15 and store the data in the computer's memory, step 72 of FIG. 4. The computer then sends a response through cable 32 to the sequence control unit 16, which then sends output via the cable 19 to retune the DME 14 to the frequency of the next transponder B2, step 74 of FIG. 4, to initiate the next range measurement. This cycle is repeated as soon as the DME has the next digital range ready for the computer.

When a sufficient amount of range and time data has been stored so that a complete set of measurements of range to all of the selected ground stations is in the computer's memory as determined at step 76 of FIG. 4, then the computer de-skews those ranges and refers all of them in that same set to an arbitrarily selected instant of time. This is accomplished in step 77 by interpolating between the range just measured for a particular ground station and the next preceeding measurement of range to the same station using the times of their respective measurements as compared with said arbitrarily selected instant of time to obtain for each measurement a corrected range referred to said instant. The next step 78 calls the location computing subroutine to process the corrected digital data set, utilizing the computational algorithm which is included in this subroutine and which uses the steps 78, 80, 82 and 84 to solve for the best aircraft position based on the six corrected ranges by computing the errors in step 82 remaining after determining all of these ranges. These determined errors comprise for the most part what were referred to above as the "bias" errors. Over a period of time, while calculating successive aircraft locations based upon successive sets of data, the computer evaluates and minimizes these errors, reworking them for each computation until it has determined optimum correction factors which provide the most accurate location of the aircraft. In other words, during each iterative computation, the improved error factor for the particular station whose range is being measured is used to correct the newly measured value of range to improve the overall accuracy. This improvement is made possible because of the fact that more than the minimum number of stations necessary to compute aircraft location are being interrogated to provide redundancy in the form of an excess of range data, which excess can then be used to improve the overall position determination as shown below wherein six transponder stations are interrogated even though only three of them would be enough to make a minimal determination of location. During each computation the excess information available over the minimum requirement is used to improve the computed position.

An iterative algorithm which is useful to provide successive solutions for aircraft location is set forth in the above mentioned Potter U.S. Pat. No. 3,659,085 beginning at line 58 of column 64 and extending through line 14 of column 67. Moreover the following discussion relates specifically to bias error minimizing with respect to six stations, as shown in FIG. 1, whose positions are represented by the coordinates $(N_i, E_i, Z_i)$ where $i = 1, 6$.

Initially, take a series of range measurements at 16 random points in the vicinity of one of those stations. With this information one can estimate the following parameters:

$(N_j, E_j)$ = the location of the aircraft for the $j$th sample; $j = 1, 16$ $\delta R_i$ = the ground station delay for the $i$th ground station; $i = 1, 6$ ($\delta R_i$ is assumed to be a constant over the time of the test for that station)

$R_{ij}$ = observed range, (i.e., the range from the $i$th ground station to the $j$th point)

Model this range as $$P_{ij} = \sqrt{(\hat{N}_j - N_i)^2 + (\hat{E}_j - E_i)^2 + (Z_{A/C} - Z_i)^2}.$$

Write $\hat{N}_j = \hat{N}_{j_o} + \xi_j$; $\hat{E}_j = \hat{E}_{j_o} + \eta_j$; $\delta R_i = \delta R_{i_o} + \zeta_i$.

Where $N_{j_o}$, $E_{j_o}$ and $\delta R_{i_o}$ are initial approximations to $\hat{N}_j$, $\hat{E}_j$, $\delta R_i$, and $\xi_j$, $\eta_j$ and $\zeta_i$ are incremental associated values which will yield an approved estimate.

Write the error expression $$\epsilon(\xi_j, \eta_j, \zeta_j) = \sum_{i,j} q_{ij}(P_{ij} - R_{ij})^2,$$

where $q_{ij}$ is a weighting factor in equation $ij$. The purpose is to find $(\xi_j, \eta_j, \zeta_j)$ which will minimize $\epsilon$.

Least squares techniques are used to solve this problem.

First, expand $P_i$ in a Taylor series ignoring terms higher than first order.

An optimum estimate of $(\xi_j, \eta_j, \zeta_i)$ is obtained by differentiating $\epsilon$ partially with respect to each of the variables $(\xi_j, \eta_j, \zeta_i)$, setting these expressions to zero, and solving the resulting linear syystem. The increments $(\xi_j, \eta_j, \zeta_i)$ are added to $\hat{N}_{j_o}$, $\hat{E}_{j_o}$ and $\delta R_i$ and unless the increments have converged to nearly zero, the procedure is reiterated.

In particular write $$P_{ij} = P_{ij_0} + \delta P_{ij}$$

where $$\delta P_{ij} = (\partial P_{ij}/\partial \hat{N}_j)\xi_j + (\partial P_{ij}/\partial E_j)\eta_j + [\partial P_{ij}/\partial(\delta R_{ij})]\zeta_i.$$

Partial derivatives are evaluated at $$\hat{N}_{j_o}, \hat{E}_{j_o}, \delta R_{i_o}.$$

Recall that $$P_{ij} = \sqrt{(\hat{N}_j - N_i)^2 + (\hat{E}_j - E_i)^2 + (Z_{A/C} - Z_i)^2} + \delta R_i$$

so that $$\delta P_{ij} = (\hat{N}_j - N_i\sqrt{\phantom{x}})\xi_j + (\hat{E}_j - E_i\sqrt{\phantom{x}})\eta_j + \pi_i;$$

where $$\sqrt{\phantom{x}} = \sqrt{(\hat{N}_{j_o} - N_i)^2 + (\hat{E}_{j_o} - E_i)^2 + (Z_{A/C} - Z_i)^2}.$$

I. Differentiating with respect to $\xi_j$:

$$0 = \frac{1}{2}\frac{\partial \epsilon}{\partial \xi_j} = \sum_{i,k} q_{ik}((P_{ik_0} - R_{ik})$$

$$+ \delta P_{ik})\frac{\partial}{\partial \xi_j}(P_{ik_0} - R_{ik} + \delta P_{ik})$$

$$\frac{\partial}{\partial \xi_j}\left(P_{ik_0} - R_{ik} + \delta P_{ik}\right) = \frac{\partial}{\partial \xi_j}\left(\delta P_{ik}\right) = \frac{\partial P_{ij}}{\partial \hat{N}_j} = \frac{\hat{N}_{j_o} - N_i}{\sqrt{\phantom{x}}}$$

for $k = j$, and 0 otherwise.
So:

$$0 = \sum_i^N q_{ij}(P_{ij_0} - R_{ij})\left(\frac{\hat{N}_{j_o} - N_i}{\sqrt{\phantom{x}}}\right)$$

$$+ \left[\sum_i^N q_{ij}\left(\frac{\hat{N}_{j_o} - N_i}{\sqrt{\phantom{x}}}\right)^2\right]\xi_j$$

$$+ \left[\sum_i^N q_{ij}\left(\frac{\hat{E}_{j_o} - E_i}{\sqrt{\phantom{x}}}\right)\left(\frac{\hat{N}_{j_o} - N_i}{\sqrt{\phantom{x}}}\right)\right]\eta_j$$

$$+ \left[\sum_{i=1}^N q_{ij}\left(\frac{\hat{N}_{j_o} - N_i}{\sqrt{\phantom{x}}}\right)\right]\zeta_i \quad (1)$$

where $N$ = number of stations.

II. Differentiating with respect to $\eta_j$:

$$0 = \frac{1}{2}\frac{\partial \epsilon}{\partial \eta_j}$$

$$= \sum_{ik}((P_{ik_0} - R_{ik}) + \delta P_{ik})\frac{\partial}{\partial \eta_j}(P_{ik_0} - R_{ik}$$

$$+ \delta P_{ik})\frac{\partial}{\partial \eta_j}(P_{ik_0} - R_{ik} + \delta P_{ik})$$

$$= \frac{\partial}{\partial \eta_j}(\delta P_{ik})$$

$$= \frac{\partial P_{ij}}{\partial E_j}$$

$$= \frac{\hat{E}_{j_o} - E_i}{\sqrt{\phantom{x}}}$$

for $k = j$, and 0 otherwise.
So:

$$0 = \sum_i^N q_{ij}(P_{ij_0} - R_{ij})\left(\frac{\hat{E}_{j_o} - E_i}{\sqrt{\phantom{x}}}\right)$$

$$+ \left[\sum_i^N q_{ij}\left(\frac{\hat{N}_{j_o} - N_i}{\sqrt{\phantom{x}}}\right)\left(\frac{\hat{E}_{j_o} - E_i}{\sqrt{\phantom{x}}}\right)\right]\xi_j$$

$$+ \left[\sum_i^N q_{ij}\left(\frac{\hat{E}_{j_o} - E_i}{\sqrt{\phantom{x}}}\right)^2\right]\eta_j + \left[\sum_i^N q_{ij}\left(\frac{\hat{E}_{j_o} - E_i}{\sqrt{\phantom{x}}}\right)\right]\zeta_i.$$

(III) Differentiating with respect to $\zeta_i$:

$$0 = \frac{1}{2}\frac{\partial \epsilon}{\partial \zeta_i}$$

$$= \sum_{l,k} q_{lk}((P_{lk_0} - P_{lk}) + \delta P_{lk})\frac{\partial}{\partial \zeta_i}(P_{lk_0}$$

$$- R_{lk} + \delta P_{lk})\frac{\partial}{\partial \zeta_i}(P_{lk_0} - R_{lk} + \delta P_{lk})$$

$$= \frac{\partial}{\partial \zeta_i}(\delta P_{ik})$$

$$= 1$$

for $l = i$, and 0 otherwise.
So:

$$0 = \sum_j^M q_{ij}(P_{ij_0} - R_{ij}) + \left[\sum_j q_{ij}\left(\frac{\hat{N}_j - N_i}{\sqrt{\phantom{x}}}\right)\zeta_j\right]$$

$$+ \left[\sum_i q_{ij}\left(\frac{\hat{E}_j - E_i}{\sqrt{\phantom{x}}}\right)\eta_j\right] + \left[\sum_j^n q_{ij}\right]\zeta_i$$

where $M$ is the number of samples.

If there are $N$ ground stations and $M$ sets of a/c range samples, there will be a system of $2M + N$ linear equations in $2M + N$ unknowns $(\xi_j, \eta_j, \zeta_i)$, $i = 1, N$ and $j = 1, M$. This is a sparse system. For example, for $M = 8$; $N = 6$ the non-zero terms are *. The matrix is symmmetric.

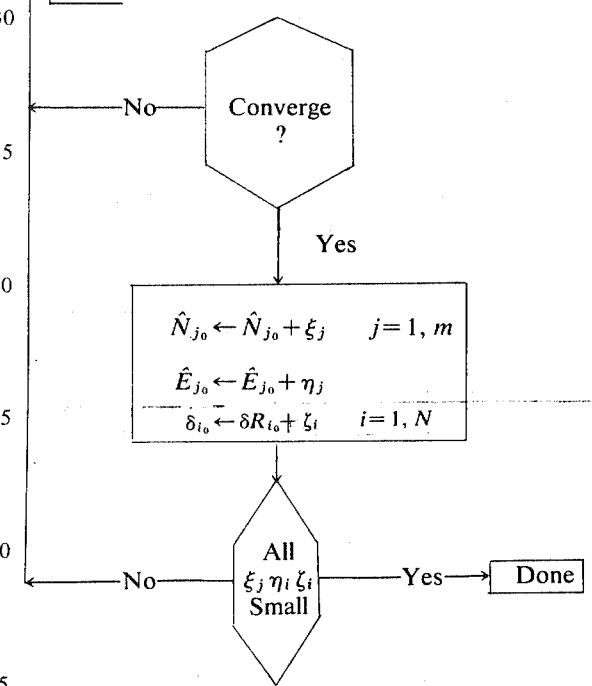

It is necessary to solve this linear system for each iteration. Since it is a system which is large order but sparse, an iterative solution technique will be used so that there will result an iterative technique within an iterative technique.

Consider the Gauss-Seidel iterative technique. In this technique new estimates are used immediately after generation. This technique can be expressed:

If the system to be solved is written $$A\vec{x}=\vec{b} \text{ or } \sum_{j=1}^{n} a_{ij}x^{(j)}=b_i \quad i=1,n$$

where $x^{(j)}$ is the $j^{th}$ component of x.

Let $x_{i+1}^{(j)}$ be the $j^{th}$ component of the $(i+1)^{th}$ iteration. As we compute $x_{i+1}^{(j)}$ we replace $x_i^{(j)}$. The Gauss Seidel method is then $$x_{i+1}^{(k)} = \frac{-1}{a_{kk}} \sum_{j+1}^{n} [a_{kj}x_i^{(j)} - b_k].$$

Then iterate in the following way:

for $j = 1, M$ $$\xi_j \leftarrow \frac{-1}{\left[\sum_{i=1}^{N} q_{ij}\left(\frac{\hat{N}_{j_0}-N_i}{\sqrt{\phantom{x}}}\right)^2\right]}$$

$$* \left\{ \left[\sum_{i=1}^{N} q_{ij}\left(\frac{\hat{E}_{j_0}-E_i}{\sqrt{\phantom{x}}}\right)\left(\frac{\hat{N}_{j_0}-N_i}{\sqrt{\phantom{x}}}\right)\right] \eta_j \right.$$

$$+ \sum_{i=1}^{N} q_{ij}\left(\frac{\hat{N}_{j_0}-N_i}{\sqrt{\phantom{x}}}\right)\zeta_i + \sum_{i=1}^{N} q_{ij}(P_{ij_0}-R_{ij})$$

$$\left. * \frac{(\hat{N}_{j_0}-N_i)}{\sqrt{\phantom{x}}} \right\}$$

$$\eta_j \leftarrow \frac{-1}{\left[\sum_{i=1}^{N} q_{ij}\left(\frac{\hat{E}_{j_0}-E_i}{\sqrt{\phantom{x}}}\right)^2\right]}$$

$$* \left\{ \left[\sum_{i=1}^{N} q_{ij}\left(\frac{\hat{N}_{j_0}-E_i}{\sqrt{\phantom{x}}}\right)\left(\frac{\hat{E}_{j_0}-E_i}{\sqrt{\phantom{x}}}\right)\right] \xi_i \right.$$

$$+ \sum_{i=1}^{N} q_{ij}\left(\frac{\hat{E}_{j_0}+E_i}{\sqrt{\phantom{x}}}\right)\zeta_i + \sum_{i=1}^{N} q_{ij}(P_{ij_0}-R_{ij})$$

$$\left. * \left(\frac{\hat{E}_{j_0}-E_i}{\sqrt{\phantom{x}}}\right) \right\}$$

for $i = 1, N$ $$\zeta_i \leftarrow \frac{-1}{\left[\sum_{j=1}^{m} q_{ij}\right]} * \left\{ \sum_{i=1}^{m} q_{ij}\left[\left(\frac{\hat{N}_{j_0}-N_i}{\sqrt{\phantom{x}}}\right)\xi_j \right.\right.$$

$$\left.\left. + \left(\frac{\hat{E}_{j_0}-E_i}{\sqrt{\phantom{x}}}\right)\eta_j + (P_{ij_0}-R_{ij}) \right] \right\}$$

Converge? — No (loop back)

Yes:
$\hat{N}_{j_0} \leftarrow \hat{N}_{j_0} + \xi_j \quad j=1, m$
$\hat{E}_{j_0} \leftarrow \hat{E}_{j_0} + \eta_j$
$\delta_{i_0} \leftarrow \delta R_{i_0} + \zeta_i \quad i=1, N$ All $\xi_j \eta_i \zeta_i$ Small — No (loop back) — Yes → Done Zeroth order timing estimate for NOVA 1200
$I * (40MN + 2M + N)$ milliseconds
$I = 4$ outer * (8 inner) = 32
$M = 16$
$N = 6$
Time = 128 seconds There are two alternative methods for doing this - Min core or Min time. Min core (does not use symmetry).

Inner iteration:
for $j = 1, m$ $$S1 \leftarrow 0;\ S2 \leftarrow 0$$

for $i = 1, NG$ $$\sqrt{} = \sqrt{(\hat{N}_{j_0} - N_i)^2 + (\hat{E}_{j_0} - E_i)^2 + (Z_{A/C} - Z_i)^2}$$

$$NI = \frac{\hat{N}_{j_0} - N_i}{\sqrt{}};\ EI = \frac{\hat{E}_{j_0} - E_i}{\sqrt{}};$$

$$PR = \sqrt{} + \delta R_{i_0} - R_{ij}$$

$$S1 \leftarrow S1 + Q_{ij}*NI*NI$$

$$S2 = S2 + Q_{ij}*(EI*NI*\text{ETA}(J) + NI*\text{ZETA}(I) + PR*NI)$$

——Next $i$ $$XI(J) = -S2/S1$$

$$S1 \leftarrow 0;\ S2 \leftarrow 0$$

for $i = 1, NG$ $$\sqrt{} = \sqrt{(\hat{N}_{j_0} - N_i)^2 + (\hat{E}_{j_0} - E_i)^2 + (Z_{A/C} - Z_i)^2}$$

$$NI = \frac{N_{j_0} - N_i}{\sqrt{}};\ EI = \frac{E_{j_0} - E_i}{\sqrt{}};$$

$$PR = \sqrt{} + \delta R_{i_0} - R_{ij}$$

$$S1 \leftarrow S1 + Q_{ij}*EI*EI$$

$$S2 \leftarrow S2 + Q_{ij}*(NI*EI*XI(J) + EI*\text{ZETA}(I) + PR*EI)$$

——Next $i$ $$\text{ETA}(J) = -S2/S1$$

——Next $J$

When a solution has been computed for the location of the aircraft, the position is compared in step 80 with the keyboard-entered desired flight path and a left/right deviation from the desired flight path is determined. Moreover, the present position can be subtracted in step 84 from the "terminal" coordinate location to provide a "range-to-go" output, and eventually a "terminate" signal. The completion of these solutions operates to call the display routine in step 86 to display left/right deviation from the desired flight path line, range-to-go, and finally termination of the preset flight path I. This information is delivered to the pilot's flight indicator 40 shown in FIG. 2. While these position and related computations are being performed by the computer including the solving of the algorithm and the display routine, the airborne DME continues performing range measurements sequentially on the ground stations, and after each such measurement it flags its ready signal to the computer which then interrupts its own computations to read and store the DME range in memory.

The present invention is not to be limited to the exact forms shown in the drawings, for obviously the system can be used to locate other types of vehicles, and other system changes may be made within the scope of the following claims.

We claim:

1. An improved system for the precision locating of aircraft with respect to multiple fixed ground stations each of which includes transponder distance measuring equipment (fixed DME) wherein each ground station is uniquely identifiable and selectible for interrogation to determine range thereto by cooperating distance measuring equipment (airborne DME) in participating aircraft, comprising in combination:
   a. in a participating aircraft an airborne DME of the agile type having means which is rapidly adjustable to select any one of said uniquely identifiable ground stations;
   b. presettable sequence control means coupled with said rapidly adjustable means in the airborne DME and operative to successively adjust said means to select the next station in a preset repeating sequence of fixed DME stations while the airborne DME determines range thereto and then to readjust the airborne DME to select the next fixed DME in the sequence; and
   c. computer means cooperative with the aircraft and operative to accept the ranges to the fixed DME stations selected in said sequence and compute the location of the aircraft.

2. The system as set forth in claim 1, wherein separate computer means is carried by each participating aircraft and each computer means has a memory, means for entering the sequence of ground stations to be interrogated into said memory, and means connecting the computer means to actuate said sequence control means to adjust the airborne DME to select the next ground station in the sequence to be interrogated in response to the airborne DME delivering to the computer means for storage a range measurement representing the range to the last selected ground station.

3. The system as set forth in claim 2, wherein said means for entering comprises a manual entry keyboard for entering said selected ground stations into said memory.

4. The system as set forth in claim 2, wherein the system includes display means, and includes keyboard means for entering the coordinates of a course to be flown including terminal point coordinates, and the computer means includes arithmetic means operative in response to the computing of an aircraft location to determine the direction necessary to be flown to arrive at said terminal point, and means to display said direction on said display means.

5. The system as set forth in claim 4, wherein the computer arithmetic means is operative in response to the computing of an aircraft location to determine distance-to-go to said terminal point and to deliver said distance to said display means.

6. The system as set forth in claim 4, wherein said keyboard means includes means for entering multiple courses to be flown including start points and terminal points, and further includes means for activating one of said entered courses at a time for comparison in the computer means with computed aircraft locations.

7. The system as set forth in claim 1, wherein said computer means accepts said measured ranges comprising successive sets of ranges each set relating to one of said repeating sequences and stores them with indications of the times when they are respectively received from the airborne DME, and said computer means selecting during reception of sets of ranges arbitrary instants of time with respect to which to compute the aircraft locations, said computer means including means for interpolating between successive range measurements to the same stations to obtain ranges corrected to said arbitrarily selected instants of time, and the computer means computing locations based on these corrected ranges.

8. The system as set forth in claim 1, wherein each ground station is uniquely identifiable and selectible by selecting its frequency channel, and each airborne DME includes agile tuning transmitter and receiver means adjustable under the control of said sequence control means to tune to a selected channel for interrogating and receiving replies from the corresponding ground station.

9. The system as set forth in claim 1, wherein a common computer means serves multiple participating aircraft, data link means for transmitting the airborne DME measured ranges from the participating aircraft to the common computer means, the computer means having memory means for storing the ranges from the participating aircraft incident to computing the aircraft locations and air traffic control display means coupled to the common computer means and operative to display said locations.

10. The system as set forth in claim 9, wherein an individual sequence control means is located in each participating aircraft, each sequence control means including timed-interval stepping means for advancing the selection of the ground stations to which the airborne DME measures range, and the timed interval of each step being long enough to permit the airborne DME to be adjusted to a ground station, interrogate it, lock onto the ground station replies, and send a measured range to the common computer means.

11. The system as set forth in claim 1, wherein said presettable sequence control means selects in its sequence more fixed DME stations than the minimum number required to locate the aircraft whereby a redundancy of ranges is determined during each of said repeating sequences, and said computer means iteratively computing each aircraft location to determine the location which will best fit said redundancy of ranges.

* * * * *